US006420054B1

(12) United States Patent
Cozar et al.

(10) Patent No.: US 6,420,054 B1
(45) Date of Patent: Jul. 16, 2002

(54) MASKING DEVICE FOR A COLOR CATHODE-RAY DISPLAY TUBE WITH A FLAT SCREEN, OF THE TYPE COMPRISING A SUPPORT FRAME FOR A TENSIONED SHADOWMASK, AND TENSIONED SHADOWMASK

(75) Inventors: Ricardo Cozar, La Fermete; Pierre-Louis Reydet, Montigny-aux-Amognes; Jean-Pierre Reyal, Eragny, all of (FR)

(73) Assignee: Imphy Ugine Precision, Puteaux (FR)

( * ) Notice: Subject to any disclaimer, the term of this patent is extended or adjusted under 35 U.S.C. 154(b) by 24 days.

(21) Appl. No.: 09/598,892

(22) Filed: Jun. 22, 2000

(30) Foreign Application Priority Data

Jun. 22, 1999 (FR) .......................................... 99 07909

(51) Int. Cl.[7] ........................... B32B 15/01; C21D 6/00

(52) U.S. Cl. ....................... 428/682; 148/621; 148/622; 148/624; 313/402; 313/407; 428/683; 428/684; 428/685; 428/637; 428/638

(58) Field of Search ................................ 428/682, 683, 428/684, 685, 637, 638; 148/621, 622, 624; 313/402, 407

(56) References Cited

U.S. PATENT DOCUMENTS 4,713,576 A 12/1987 Misumi et al. ............. 313/402
5,164,021 A 11/1992 Kato et al. .................. 148/621

FOREIGN PATENT DOCUMENTS

DE 36 42 205 1/1988

OTHER PUBLICATIONS

Patent Abstracts of Japan; vol. 1998, No. 08; Jun. 30, 1998 & JP 10 060528; Mar. 3, 1998.

Patent Abstracts of Japan; vol. 15, No. 500; Dec. 1991 & JP 03 219051; Sep. 26, 1991.

Patent Abstracts of Japan; vol. 1998, No. 05; Apr. 30, 1998 & JP 10 017997; Jan. 20, 1998.

Patent Abstracts of Japan; vol. 12, No. 028; Jan. 27, 1998 & JP 62 177154; Aug. 4, 1987.

*Primary Examiner*—Robert R. Koehler
(74) *Attorney, Agent, or Firm*—Oblon, Spivak, McClelland, Maier & Neustadt, P.C.

(57) ABSTRACT

Masking device for a color cathode-ray display tube with a flat scree, of the type comprising a support frame for a tensioned shadowmask and a tensioned shadowmask mounted on the support frame so as to undergo tensioning at room temperature, in which device the support frame is made of a hardened Fe—Ni alloy having a thermal expansion coefficient between 20° and 150° C. of less than $5\times10^{316}$ $K^{-1}$ and a yield stress $R_{p0.2}$ at 20° C. of greater than 700 MPa, and the tensioned shadowmask is made of a hardened FeNi or Fe—Ni alloy having a thermal expansion coefficient between 20° C. and 150° C. of less than $5\times10^{-6}$ $K^{-1}$.

15 Claims, 2 Drawing Sheets

MASKING DEVICE FOR A COLOR CATHODE-RAY DISPLAY TUBE WITH A FLAT SCREEN, OF THE TYPE COMPRISING A SUPPORT FRAME FOR A TENSIONED SHADOWMASK, AND TENSIONED SHADOWMASK

The present invention relates to a masking device for a colour cathode-ray display tube with a flat screen, of the type comprising a support frame for a tensioned shadowmask and a tensioned shadowmask mounted on the support frame.

Colour cathode-ray display tubes comprise, in a known manner, a display screen provided with phosphors, an electron gun producing 3 electron beams and a masking device consisting of a shadowmask mounted on a support frame, which is placed opposite the display screen and intended to ensure good quality of the image displayed. The shadowmask consists of a metal foil drilled with a plurality of holes or of slots through which the three electron beams pass in order to excite the phosphors placed on the screen. The quality of the image obtained is better the more precise the alignment between the phosphors, the holes in the shadowmask and the electron beams. When the display tube is in operation, a significant part of the electron beams is intercepted by the shadowmask, which results in the latter being heated locally, heating which can deform it and therefore degrade the quality of the image displayed. In addition, the quality of the image may also be degraded by the vibrations of the shadowmask which are caused by various vibration sources. To obtain high-quality images, the shadowmask must, on the one hand, be insensitive to localized heating and, on the other hand, to have a vibration eigenfrequency high enough for the amplitude of these vibrations not to disturb the colour of the images by a misalignment of the electron beams, of the holes in the shadowmask and of the phosphors.

When the display screen is curved, the shadowmask has a shape which matches that of the screen and the problems of sensitivity to localized heating and of vibration are solved by making the shadowmask by drawing a sheet of an Fe—Ni alloy having a very low expansion coefficient and filled with holes. The shadowmask is simply welded to a support frame which exerts no force on the shadowmask. The frame may therefore be light, which has advantages.

When the display screen is flat, the shadowmask may be an undrawn foil fastened, for example, by welding it to a precompressed support frame which then exerts a tension in the shadowmask. The shadowmask is then referred to as a "tensioned" shadowmask. The tension in the shadowmask is intended, on the one hand, to solve the problem of sensitivity to localized heating and, on the other hand, to increase the vibration eigenfrequency of the shadowmask in order to attenuate the amplitude of these vibrations. This solution assumes, in particular, the use of a material whose characteristics allow a sufficient tension to be maintained in the operating temperature range of the cathode-ray tube (approximately 100° C.) , and this being so after heating to approximately 500° C. during the manufacture of the cathode-ray tube. This is because the shadowmask is mounted tensioned on its support frame and then the assembly is placed in the cathode-ray tube which is then sealed at a temperature of approximately 500° C. for one hour. This heating may cause both the shadowmask and its frame to creep, which may detension the shadowmask.

In order to manufacture a tensioned shadowmask and its support frame, it has been proposed to use a low-alloy steel (i.e. a steel generally containing less than 5% of alloying elements). However, since the thermal expansion coefficient of this steel is high, the tension in the shadowmask must be greater than 200 MPa in order to avoid deformations due to the localized heating. This solution leads to a heavy frame, the weight of which may be as much as 6 kg or even higher.

In order to manufacture a tensioned shadowmask and its support frame, it has also been proposed to produce the shadowmask from an Fe—Ni alloy having a low expansion coefficient and the frame from steel. However, it is then necessary to provide means for preventing the shadowmask from being overtensioned when sealing the tube at 500° C., otherwise the shadowmask will tear during this operation.

The object of the present invention is to remedy these drawbacks by proposing a means for manufacturing a tensioned shadowmask and its support frame which are insensitive to localized heating, have a suitable vibration eigenfrequency and are well able to withstand the operation of sealing the tube at high temperature.

For this purpose, the subject of the invention is a masking device for a colour cathode-ray display tube with a flat screen, of the type comprising a support frame for a tensioned shadowmask and a tensioned shadowmask mounted on the support frame so as to undergo tensioning at room temperature. The support frame is made of a hardened Fe—Ni alloy having a thermal expansion coefficient between 20° C. and 150° C. of less than $5\times10^{-6}$ $K^{-1}$ and a yield stress $R_{p0.2}$ at 20° C. of greater than 700 MPa and the tensioned shadowmask is made of a hardened Fe—Ni or FeNi alloy having a thermal expansion coefficient between 20° C. and 150° C. of less than $5\times10^{-6}$ $K^{-1}$.

The hardened Fe—Ni alloy of which the support frame is composed may, for example, be a structurally hardened Fe—Ni alloy of the "γ'-hardened "type" whose chemical composition is such that (in percent by weight):

$40.5\% \leqq Ni+Co+Cu \leqq 44.5\%$ $0\% \leqq Co \leqq 5\%$ $0\% \leqq Cu \leqq 3\%$ $1.5\% \leqq Ti \leqq 3.5\%$ $0.05\% \leqq Al \leqq 1\%$ $C \leqq 0.05\%$ $Si \leqq 0.5\%$ $Mn \leqq 0.5\%$ $S \leqq 0.01\%$ $P \leqq 0.02\%$ the balance being iron and impurities resulting from the smelting.

The hardened Fe—Ni alloy of which the support frame is composed may also be an Fe—Ni alloy of the "carbide-hardened" type having a chemical composition such that (in percent by weight):

$36\% \leqq Ni+Co+Cu \leqq 40\%$ $0\% \leqq Co \leqq 5\%$ $0\% \leqq Cu \leqq 3\%$ $1.6\% \leqq Mo \leqq 2.8\%$ $0.4\% \leqq Cr \leqq 1.5\%$ $0.15\% \leqq C \leqq 0.35\%$ Si≦0.5%

Mn≦0.5%

S≦0.01%

P≦0.02% the balance being iron and impurities resulting from the smelting.

The hardened Fe—Ni alloy of which the support frame is composed may also be an Fe—Ni alloy of the "beryllium-hardened" type having a chemical composition such that (in percent by weight):

34%≦Ni+Co+Cu≦38%

0%≦Co≦5%

0%≦Cu≦3%

0.15%≦Be≦1%

C≦0.05%

Si≦0.5%

Mn≦1%

S≦0.01%

P≦0.02% the balance being iron and impurities resulting from the smelting.

The hardened Fe—Ni alloy of which the support frame is composed may also be an Fe—Ni alloy of the "solid-solution-hardened" type having a chemical composition such that (in percent by weight):

38%≦Ni+Co+Cu≦42%

0%≦Co≦5%

0%≦Cu≦3%

1%≦Nb≦4%

C≦0.05%

Si≦0.5%

Mn≦0.5%

S≦0.01%

P≦0.02% the balance being iron and impurities resulting from the smelting.

Preferably, the shadowmask is an Fe—Ni alloy whose thermal expansion coefficient between 20° C. and 150° C. is less than $2\times10^{-6}$ $K^{-1}$ and whose chemical composition may comprise (in percent by weight):
ti 32%≦Ni≦37%

0%≦Co≦5.5%

0%≦Mn≦0.5%

Si≦0.2%

C≦0.02%

S≦0.01%

P≦0.02% the balance being iron and impurities resulting from the smelting. The tension in the shadowmask is then preferably less than 120 MPa.

The shadowmask may also be made of a hardened Fe—Ni alloy of the "γ'-hardened" type, of the "carbide-hardened" type, of the "beryllium-hardened" type or of the "solid-solution-hardened" type, as defined above. The tension in the shadowmask may then be greater than 150 MPa.

The invention also relates to a process for the manufacture of the shadowmask support frame of a masking device for a colour cathode-ray display tube with a flat screen, the shadowmask support frame of which is made of a "γ'-hardened" Fe—Ni alloy. According to this process, a strip of a "γ'-hardened" Fe—Ni alloy, which is annealed or annealed and work-hardened and then stress-relieved, is used, with which strip a frame blank is produced by cutting, bending and welding, and then the frame blank undergoes a hardening heat treatment at a temperature of between 600° C. and 800° C. for a time of between 30 minutes and 2 hours.

The invention also relates to a process for the manufacture of the shadowmask support frame of a masking device for a colour cathode-ray display tube with a flat screen, the shadowmask support frame of which is made of a "carbide-hardened" Fe—Ni alloy. According to this process, the shadowmask support frame is manufactured by cutting, bending and welding a sheet of a "carbide-hardened" Fe—Ni alloy, obtained by cold rolling with a reduction ratio of greater than 50%, and by a hardening heat treatment at a temperature of between 650° C. and 850° C. for 1 minute to 2 hours, optionally followed by a complementary cold-rolling step with a reduction ratio of less than 70% and by a stress-relieving heat treatment at a temperature of between 400° C. and 600° C.

When the Fe—Ni alloy is of the "beryllium-hardened" type, the cold rolling is carried out with a reduction ratio of between 20% and 80% and the hardening treatment is a soak between 400° C. and 700° C. for a time of between 1 minute and 8 hours.

When the Fe—Ni alloy is of the "solid-solution-hardened" type, the cold rolling is carried out with a reduction ratio of between 20% and 70% and the heat treatment is a stress-relieving treatment corresponding to a soak between 400° C. and 600° C.

It should be noted that, instead of being formed by cutting and bending a strip, the frame may be manufactured by assembling tubes of square, triangular or round cross section. The hardening heat treatment is carried out either before or after the frame is mounted.

The invention will now be described in greater detail and illustrated by examples, but in a non-limiting manner, with regard to the appended figures in which.

Figure 1:
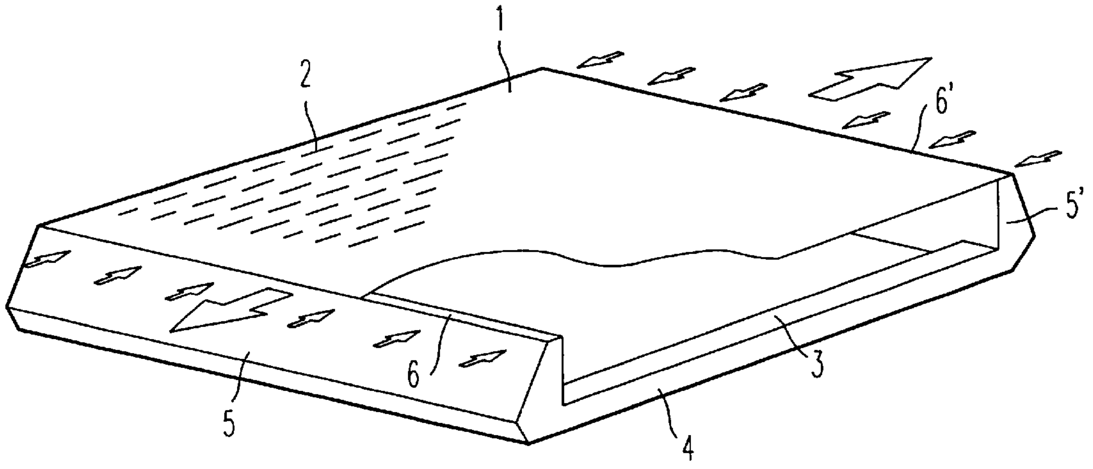
FIG. 1 shows in perspective, schematically, a masking device for a colour cathode-ray display tube with a flat screen.

The masking device for a colour cathode-ray display tube with a flat screen shown in FIG. 1 comprises a shadowmask 1 consisting of a foil drilled with a plurality of holes 2 and a support frame 3 comprising lateral uprights 4 (only one being visible in the figure) and end uprights 5 and 5'. The shadowmask 1 is fastened, for example, by welding it to the upper edges 6 and 6' of the end uprights 5 and 5'.

During mounting, the support frame 3 is subjected to compressive forces (small arrows in FIG. 1) which are intended to generate an elastic deformation which reduces the separation of the end uprights 5 and 5' and the shadowmask is subjected to tensile forces (large arrows in FIG. 1) which are intended to generate an elongational elastic deformation. The shadowmask is then fastened by welding it to the support frame and the compressive and tensile forces are removed. However, elastic deformations of the support frame and of the shadowmask persist, so that the shadowmask remains under tension.

The device consisting of the support frame and of the shadowmask is then mounted in the cathode-ray tube and the latter is sealed at a temperature close to 500° C. for approximately 1 hour. The heating of around 500° C. causes expansion of the support frame and expansion of the shadowmask which may either increase the tension in the shadowmask if the support frame expands more than the shadowmask, or may maintain the tension if the expansions are identical, or reduce the tension if the support frame expands less than the shadowmask. When the tension remains significant, it results in creep deformation of the support frame (reduction in length) and of the shadowmask (increase in length). After returning to room temperature, these creep deformations are superimposed on the initial elastic deformations, so that the tension in the shadowmask is reduced.

When the creep deformations are low enough, the residual tension in the shadowmask is sufficient for the vibration eigenfrequency of the shadowmask to be satisfactory and to induce, at every point, an elastic deformation which makes it possible to absorb the expansions resulting from the localized heating and thus to prevent the shadowmask from being deformed due to the effect of this localized heating.

In a first embodiment, the shadowmask consists of an Fe—Ni alloy whose thermal expansion coefficient between 20° C. and 150° C. is less than $2\times10^{-6}$ $K^{-1}$ and the support frame is made of a hardened Fe—Ni alloy having a thermal expansion coefficient between 20° C. and 150° C. of less than $5\times10^{6}$ $K^{-1}$, a yield stress $R_{p0.2}$ at 20° C. of greater than 700 MPa and a creep elongation at 500° C. of less than 0.01% under a stress of 300 MPa.

The alloy of which the shadowmask is composed has a chemical composition which comprises, by weight:

$32\% \leq Ni \leq 37\%$ $0\% \leq Co \leq 5.5\%$ $0\% \leq Mn \leq 0.5\%$ $Si \leq 0.2\%$ $C \leq 0.02\%$ $S \leq 0.01\%$ $P \leq 0.02\%$ the balance being iron and impurities resulting from the smelting.

This alloy is, for example, either an alloy containing from 35% to 37% nickel, less than 0.4%, or even better less than 0.1%, manganese and no cobalt or an alloy containing from 32% to 34% nickel, 3.5% to 5.5% cobalt and less than 0.1% manganese.

This alloy may be used in the annealed state above 750° C. after cold rolling in order to have a yield stress of between 260 MPa and 300 MPa and a creep elongation at 500° C. of less than 0.02% under a stress of 50 MPa. In this case, the tension in the shadowmask must preferably not generate a stress greater than 60 MPa in the etched region of the shadowmask, which stress is, given the low expansion coefficient, sufficient to minimize the effects of the localized heating.

The alloy may also be used in the work-hardened state, or better still in the work-hardened and stress-relieved state; in the latter case, the tension in the shadowmask may especially be up to 120 MPa. Such a tension may allow the vibration behaviour of the shadowmask to be improved.

The hardened Fe—Ni alloy of which the support frame is composed is, for example, either an alloy of the "γ'-hardened" type or an alloy of the "carbide-hardened" type or of the "beryllium-hardened" type or of the "solid-solution-hardened" type.

The chemical composition of an alloy of the "γ'-hardened" type comprises, for example, in percent by weight:

$40.5\% \leq Ni+Co+Cu \leq 44.5\%$ $0\% \leq Co \leq 5\%$ $0\% \leq Cu \leq 3\%$ $1.5\% \leq Ti \leq 3.5\%$ $0.05\% \leq Al \leq 1\%$ $C \leq 0.05\%$ $Si \leq 0.5\%$ $Mn \leq 0.5\%$ $S \leq 0.01\%$ $P \leq 0.02\%$ the balance being iron and impurities resulting from the smelting.

The nickel content is chosen so as to obtain a satisfactory thermal expansion coefficient. Some of the nickel may be substituted with cobalt or with copper, so that these elements are given as an option, their contents possibly being zero.

The titanium and aluminium allow structural hardening to be obtained by homogeneous and coherent precipitation of the $(Ti,Al)Ni_3$ γ' phase.

When the alloy used is of the "γ'-hardened" type, the shadowmask support frame is manufactured from a strip having a thickness of, for example between 0.5 mm and 3 mm, obtained by cold rolling and annealed preferably at a temperature of between 900° C. and 1100° C. After the annealing, the strip may optionally undergo a complementary cold-rolling step with a reduction ratio of less than 30% followed by a stress-relieving step carried out on the run sufficiently rapidly to precipitate the γ' phase at a temperature of between 400° C. and 600° C.

In order to manufacture the shadowmask support frame, pieces are cut from the strip which are then formed, for example by bending, and assembled or fastened by welding, by screwing, by clinching or by any other means, so as to obtain a support frame blank. The support frame blank then undergoes a precipitation hardening heat treatment consisting of a soak at a temperature of between 600° C. and 800° C. for a time of between 30 minutes and 2 hours.

The frame may also be manufactured by cutting, forming and assembling a strip which beforehand has been work-hardened and hardened by heat treatment on the run between 700° C. and 850° C. for 1 to 15 minutes, or by a static heat treatment between 600° C. and 800° C. for a time of between 30 minutes and 2 hours. In this case, the heat treatment is carried out on a strip directly coming from the cold rolling.

In both cases, the hardening heat treatment makes it possible to obtain a yield stress $R_{p0.2}$ of greater than 700 MPa.

By way of example, with an alloy of the "γ'-hardened" type whose chemical composition comprises (in percent by weight):

| Ni | Co | Cu | Ti | Al | C | Si | Mn | S | P | Fe |
|---|---|---|---|---|---|---|---|---|---|---|
| 42.4 | 0.02 | 0.01 | 2.57 | 0.18 | 0.01 | 0.03 | 0.10 | 0.002 | 0.005 | Bal |

after hardening treatment at 700° C. for 1 hour, carried out on a strip annealed at 960° C. for 30 minutes after cold rolling, the following mechanical properties are obtained:

yield stress $R_{p.02}$:860 MPa tensile strength $R_m$:1156 MPa uniform $A_u$:13.8% elongation total elongation $A_t$:17.1%.

The thermal expansion coefficient of this alloy is $3.4\times10^{-6}$ between 20° C. and 150° C.

The chemical composition of an alloy of the "carbide-hardened" type comprises, for example, in percent by weight:

36%≦Ni+Co+Cu≦40%

0%≦Co≦5%

0%≦Cu≦3%

1.6%≦Mo≦2.8%

0.4%≦Cr≦1.5%

0.15%≦C≦0.35%

Si≦0.5%

Mn≦0.5%

S≦0.01%

P≦0.02% the balance being iron and impurities resulting from the smelting.

The nickel content is chosen in order to obtain a thermal expansion coefficient between 20° C. and 150° C. of less than $5\times10^{-6}$ $K^{-1}$. The nickel may be partially replaced with cobalt or with copper, so that these elements are optional. The molybdenum, chromium and carbon allow the formation of carbides which harden the structure.

With this alloy, the support frame is manufactured by cutting, bending and assembling, by welding, clinching, screwing or any other means, a strip obtained by cold rolling with a reduction ratio of between 60% and 80%, followed by a hardening heat treatment that may be carried out on the run for 1 to 15 minutes between 750° C. and 850° C., or statically for 15 minutes to 2 hours, between 650° C. and 750° C. Optionally, after the hardening heat treatment, the strip may undergo a complementary cold-rolling step with a reduction ratio of less than 70% followed by a stress-relieving heat treatment between 400° C. and 600° C. for 30 seconds to 5 minutes. The strip thus obtained has a yield stress of greater than 700 MPa and an elongation at break of greater than 5%, sufficient to allow forming by bending.

By way of example, with an alloy of the "carbide-hardened" type having the following chemical composition (in percent by weight):

| Ni | Co | Mo | Cr | C | Si | Mn | S | P | Fe |
|---|---|---|---|---|---|---|---|---|---|
| 37.9 | 0.05 | 2.05 | 0.80 | 0.24 | 0.16 | 0.20 | <0.001 | 0.006 | Bal |

after cold rolling with a reduction ratio of 70% and a hardening heat treatment on the run at 800° C. for 1 to 2 minutes, the following mechanical properties are obtained:

yield stress $R_{p0.2}$:766 MPa tensile strength $R_m$:922 MPa distributed elongation $A_u$:14.8% total elongation $A_t$::15.1%.

The thermal expansion coefficient between 20° C. and 150° C. is $3.7\times10^{-6}$ $K^{-1}$.

When a complementary cold-rolling step is carried out with a reduction ratio of 30% and a stress-relieving step is carried out at 700° C. for 1 to 2 minutes, the following properties are obtained:

yield stress $R_{p0.2}$:1013 MPa tensile strength $R_m$:1090 MPa distributed elongation $A_u$:7.9% total elongation $A_t$::11.6%

The expansion coefficient between 20° C. and 150° C. is $2.8\times10^{-6}$ $K^{-1}$.

The chemical composition of an alloy of the "beryllium-hardened" type comprises, for example, in percent by weight:

34%≦Ni+Co+Cu≦38%

0%≦Co≦5%

0%≦Cu≦3%

0.15%≦Be≦1%

C≦0.05%

Si≦0.5%

Mn≦1%

S≦0.01%

P≦0.02% the balance being iron and impurities resulting from the smelting.

With this alloy, the support frame is manufactured by cutting, bending and assembling, by welding, clinching, screwing or any other means, a strip obtained by cold rolling with a reduction ratio of between 20% and 80%, followed by a hardening heat treatment consisting of a soak between 400° C. and 700° C. for 1 minute to 8 hours.

By way of example, with an alloy of the "beryllium-hardened" type having the following chemical composition (in percent by weight):

| Ni | Co | Cu | Be | C | Si | Mn | S | P | Fe |
|---|---|---|---|---|---|---|---|---|---|
| 36.2 | 0.10 | 0.05 | 0.25 | 0.04 | 0.20 | 0.64 | 0.003 | 0.006 | Bal |

after cold rolling with a reduction ratio of 60% and a hardening heat treatment at 550° C. for 1 hour, the following mechanical properties are obtained:

yield stress $R_{p0.2}$:843 MPa tensile strength $R_m$:916 MPa total elongation $A_r$:4.2%

The chemical composition of an alloy of the "solid-solution-hardened" type comprises, for example, in percent by weight:

38%≦Ni+Co+Cu≦42%

0%≦Co≦5%

0%≦Cu≦3%

1%≦Nb≦4%

C≦0.05%

Si≦0.5%

Mn≦0.5%

S≦0.01%

P≦0.02% the balance being iron and impurities resulting from the smelting.

With this alloy, the support frame is manufactured by cutting, bending and assembling, by welding, clinching, screwing or any other means, a strip obtained by cold rolling with a reduction ratio of between 20% and 70% followed by a stress-relieving heat treatment consisting of a soak between 400° C. and 600° C.

By way of example, with an alloy of the "solid-solution-hardened" type having the following chemical composition (in percent by weight):

| Ni | Co | Cu | Nb | C | Si | Mn | S | P | Fe |
|---|---|---|---|---|---|---|---|---|---|
| 39.8 | 0.04 | 0.20 | 1.98 | 0.005 | 0.10 | 0.38 | 0.001 | 0.004 | Bal |

after cold rolling with a reduction ratio of 33% and stress-relieving heat treatment at 550° C. for 1 minute, the following mechanical properties are obtained:

yield stress $R_{p0.2}$:804 MPa tensile strength $R_m$:968 MPa total elongation $A_r$:8.1%

The use of alloys having a low expansion coefficient makes it possible to obtain good coMPatibility between the shadowmask and its support frame, in particular to avoid an excessively large variation in the tension in the shadowmask when the temperature varies because of differential expansion.

The yield stress $R_{p0.2}$ at 20° C. greater than 700 MPa and very good creep strength at 500° C. make it possible to manufacture a light frame since the stresses to which its elements are subjected may be high. The lightness of the support frame is conducive to low sensitivity of the masking device to temperature variations.

The good creep behaviour of the alloys of which the shadowmask and the support frame are composed makes it possible to maintain a satisfactory tension in the shadowmask after the heating at around 500° C. intended to seal the screen tile onto the glass cone of the cathode-ray tube, this being especially so when the desired tension for the shadowmask is not too high.

Figure 2:
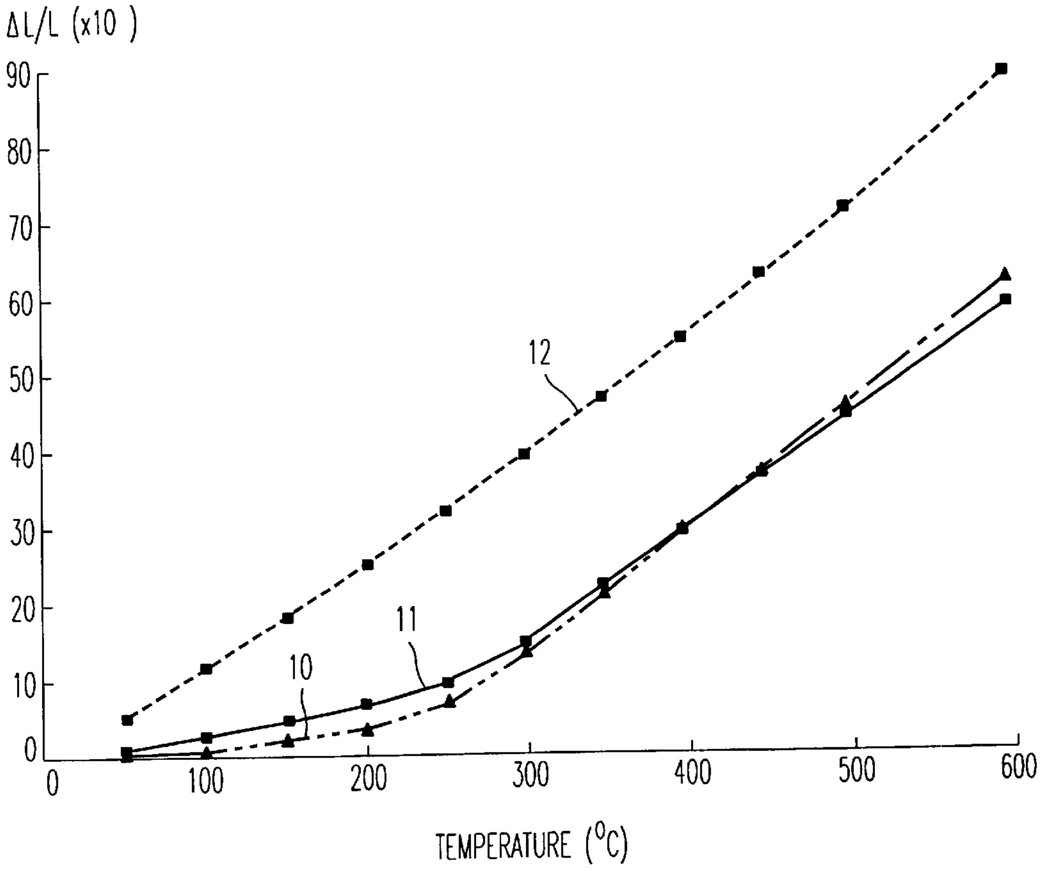
FIG. 2 shows curves of the expansion between 20° C. and 600° C. of Fe—Ni alloys and of steel.

Moreover, and as shown by the curves in FIG. 2, whereas the average expansion coefficient between 20° C. and 150° C. of the alloy of which the shadowmask is composed (curve 10, FeNi alloy) is less than that of the alloy of which the support frame is composed (curve 11, hardened FeNi alloy), the average expansion coefficients between 20° C. and 500° C. are close. This is favourable because, since the expansion of the support frame at 500° C. is close to that of the shadowmask, the tension in the shadowmask remains close to the tension created when it was mounted. On the other hand, between 100° C. and 150° C. approximately, that is to say at the operating temperatures of the shadowmask, the tension is increased because of the expansion differential, and this results in a reduction in the sensitivity to localized heating and, above all, to a reduction in the vibration sensitivity.

By way of comparison, curve 12 in FIG. 2, relating to a low-alloy steel, shows that the expansion differential between this steel and the Fe—Ni alloy having a low expansion coefficient is such that if the support frame were made of steel and the shadowmask of an Fe—Ni alloy having a low expansion coefficient, in the absence of suitable compensation means, the heating produced when the cathode-ray tube is sealed would result in fracture of the shadowmask.

In a second embodiment, the support frame, as in the first embodiment, is made of a hardened Fe—Ni alloy, for example of the "γ'-hardened" type, of the "carbide-hardened" type, of the "beryllium-hardened" type or of the "solid-solution-hardened" type. However, the shadowmask itself also consists of a hardened Fe—Ni alloy, for example of the "γ'-hardened" type, of the "carbide-hardened" type, of the "beryllium-hardened" type or of the "solid-solution-hardened" type, such as those described above. In this case, the hardening treatment is carried out before chemical etching of the shadowmask. The shadowmask is then mounted on the support frame with a tension which may be greater than 150 MPa, or even greater than 200 MPa (but this tension must remain less than 300 MPa), thereby making it possible to increase the vibration eigenfrequency or to reduce the thickness of the shadowmask. Such a tension in the shadowmask is made possible by the tensile and creep-strength properties of the structurally hardened alloy which are substantially higher than those of the annealed Fe—Ni alloy used in the first embodiment.

What is claimed is:

1. Masking device for a colour cathode-ray display tube with a flat screen, comprising a support frame for a tensioned shadowmask and a tensioned shadowmask mounted on the support frame so as to undergo tensioning at room temperature, wherein:

the support frame is made of a hardened Fe—Ni 1 alloy having a thermal expansion coefficient between 20° C. and 150° C. of less than $5\times10^{-6}$ $K^{-1}$ and a yield stress $R_{p0.2}$ at 20° C. of greater than 700 MPa;

the tensioned shadowmask is made of a hardened Fe—Ni or FeNi alloy having a thermal expansion coefficient between 20° C. and 150° C. of less than $5\times10^{-6}$ $K^{-1}$.

2. Device according to claim 1, wherein the hardened Fe—Ni alloy of which the support frame is composed is a γ'-hardened FeNi alloy of the type whose chemical composition comprises, by weight:

$40.5\% \leqq Ni+Co+Cu \leqq 44.5\%$ $0\% \leqq Co < 5\%$ $0\% \leqq Cu \leqq 3\%$ $1.5\% \leqq Ti \leqq 3.5\%$ $0.05\% \leqq Al \leqq 1\%$ $C \leqq 0.05\%$ $Si \leqq 0.5\%$ $Mn \leqq 0.5\%$ $S \leqq 0.01\%$ $P \leqq 0.02\%$ the balance being iron and impurities resulting from smelting.

3. Device according to claim 1, wherein the hardened Fe—Ni alloy of which the support frame is composed is carbide-hardened FeNi alloy whose chemical composition comprises, by weight:

$36\% \leqq Ni+Co+Cu \leqq 40\%$ $0\% \leqq Co \leqq 5\%$ $0\% \leqq Cu \leqq 3\%$ $1.6\% \leqq Mo \leqq 2.8\%$ $0.4\% \leqq Cr \leqq 1.5\%$ $0.15\% \leqq C \leqq 0.35\%$ $Si \leqq 0.5\%$ $Mn \leqq 0.5\%$ $S \leqq 0.01\%$ $P \leqq 0.02\%$ the balance being iron and impurities resulting from smelting.

4. Device according to claim 1, wherein the hardened Fe—Ni alloy of which the support frame is composed is a beryllium-hardened FeNi alloy whose chemical composition comprises, by weight:

$34\% \leqq Ni+Co+Cu \leqq 38\%$ $0\% \leqq Co \leqq 5\%$ $0\% \leqq Cu \leqq 3\%$ $0.15\% \leqq Be < 1\%$ $C \leqq 0.05\%$ $Si \leqq 0.5\%$ $Mn \leqq 1\%$ $S \leqq 0.01\%$ $P \leqq 0.02\%$ the balance being iron and impurities resulting from smelting.

5. Device according to claim 1, wherein the hardened Fe—Ni alloy of which the support frame is composed is a solid-solution-hardened FeNi alloy whose chemical composition comprises, by weight:

$38\% \leqq Ni+Co+Cu \leqq 42\%$ $0\% \leqq Co \leqq 5\%$ $0\% \leqq Cu \leqq 3\%$ $1\% \leqq Nb \leqq 4\%$ $C \leqq 0.05\%$ $Si \leqq 0.5\%$ $Mn \leqq 0.5\%$ $S0.01\%$ $P \leqq 0.02\%$ the balance being iron and impurities resulting from smelting.

6. Device according to claim 1 characterized in that the shadowmask is an Fe—Ni alloy whose thermal expansion coefficient between 20° C. and 150° C. is less than $2\times10^{-6}$ $K^{-1}$.

7. Device according to claim 6, characterized in that the chemical composition of the alloy of which the shadowmask is composed comprises, by weight:

$32\% \leqq Ni \leqq 37\%$ $0\% \leqq Co \leqq 5.5\%$ $0\% \leqq Mn \leqq 0.5\%$ $Si \leqq 0.2\%$ $C \leqq 0.02\%$ $S \leqq 0.01\%$ $P \leqq 0.02\%$ the balance being iron and impurities resulting from the smelting.

8. Device according to claim 1 characterized in that the tension in the shadowmask is greater than 150 MPa and in that the chemical composition of the alloy of which the shadowmask is composed comprises, by weight:

$40.5\% \leqq Ni+Co+Cu \leqq 44.5\%$ $0\% \leqq Co \leqq 5\%$ $0\% \leqq Cu \leqq 3\%$ $1.5\% \leqq Ti \leqq 3.5\%$ $0.05\% \leqq Al \leqq 1\%$ $C \leqq 0.05\%$ $Si \leqq 0.5\%$ $Mn \leqq 0.5\%$ $S \leqq 0.01\%$ $P \leqq 0.02\%$ the balance being iron and impurities resulting from the smelting.

9. Device according to claim 1 characterized in that the tension in the shadowmask is greater than 150 MPa and in that the chemical composition of the alloy of which the shadowmask is composed comprises, by weight:

36%≦Ni+Co+Cu≦40%

0%≦Co≦5%

0%≦Cu≦3%

1.6%≦Mo≦2.8%

0.4%≦Cr≦1.5%

0.15%≦C≦0.35%

Si≦0.5%

Mn≦0.5%

S≦0.01%

P≦0.02% the balance being iron and impurities resulting from the smelting.

10. Device according to claim 1 characterized in that the tension in the shadowmask is greater than 150 MPa and in that the chemical composition of the alloy of which the shadowmask is composed comprises, by weight:

34%≦Ni+Co+Cu≦38%

0%≦Co≦5%

0%≦Cu≦3%

0.15%≦Be≦1%

C≦0.05%

Si≦0.5%

Mn≦1%

S≦0.01%

P≦0.02% the balance being iron and impurities resulting from the smelting.

11. Device according to claim 1 characterized in that the tension in the shadowmask is greater than 150 MPa and in that the chemical composition of the alloy of which the shadowmask is composed comprises, by weight:

38%≦Ni+Co+Cu≦42%

0%≦Co≦5%

0%≦Cu≦3%

1%≦Nb≦4%

C≦0.05%

Si≦0.5%

Mn≦0.5%

S≦0.01%

P≦0.02% the balance being iron and impurities resulting from the smelting.

12. Process for the manufacture of a device according to claim 2, wherein, in order to manufacture the support frame for the shadowmask, a strip of a structurally hardened Fe—Ni alloy, which is annealed or annealed and hardened and then stress relieved, is used, a frame blank is produced by cutting, bending and assembling the strip of γ'-hardened Fe—Ni alloy and then the frame blank undergoes a hardening heat treatment at a temperature of between 600° C. and 800° C. for a time of between 30 minutes and 2 hours.

13. Process for the manufacture of a device according to claim 3, wherein, in order to manufacture the shadowmask support frame, a strip of carbide-hardened Fe—Ni alloy is cold rolled with a reduction ratio of greater than 50%, the cold-rolled strip undergoes a hardening heat treatment, either carried out on the run at a temperature of between 750° C. and 850° C. for 1 to 15 minutes or carried out statically at a temperature of between 650° C. and 750° C. for 15 minutes to 2 hours, a complementary cold-rolling operation is optionally carried out with a reduction ratio of less than 70% followed by a stress-relieving heat treatment at a temperature of between 400° C. and 600° C. for 30 seconds to 5 minutes, and the shadowmask support frame is manufactured by cutting, bending and assembling the strip.

14. Process for the manufacture of a device according to claim 4, wherein in order to manufacture the shadowmask support frame, a strip of beryllium-hardened Fe—Ni alloy is cold rolled with a reduction ratio of between 20% and 80%, the cold-rolled strip undergoes a hardening heat treatment at a temperature of between 400° C. and 700° C. for 1 minute to 8 hours and the shadowmask support frame is manufactured by cutting, bending and assembling the strip.

15. Process for the manufacture of a device according to claim 5, wherein, in order to manufacture the shadowmask support frame, a strip of solid-solution hardened Fe—Ni alloy is cold rolled with a reduction ratio of between 20% and 70%, the cold-rolled strip undergoes a stress-relieving heat treatment at a temperature of between 400° C. and 600° C. and the shadowmask support frame is manufactured by cutting, bending and assembling the strip.

* * * * *